E. DUNLAP.
MOUNT FOR PLOWS AND OTHER TOOLS.
APPLICATION FILED JULY 19, 1920.
1,375,577.
Patented Apr. 19, 1921.
3 SHEETS—SHEET 1.
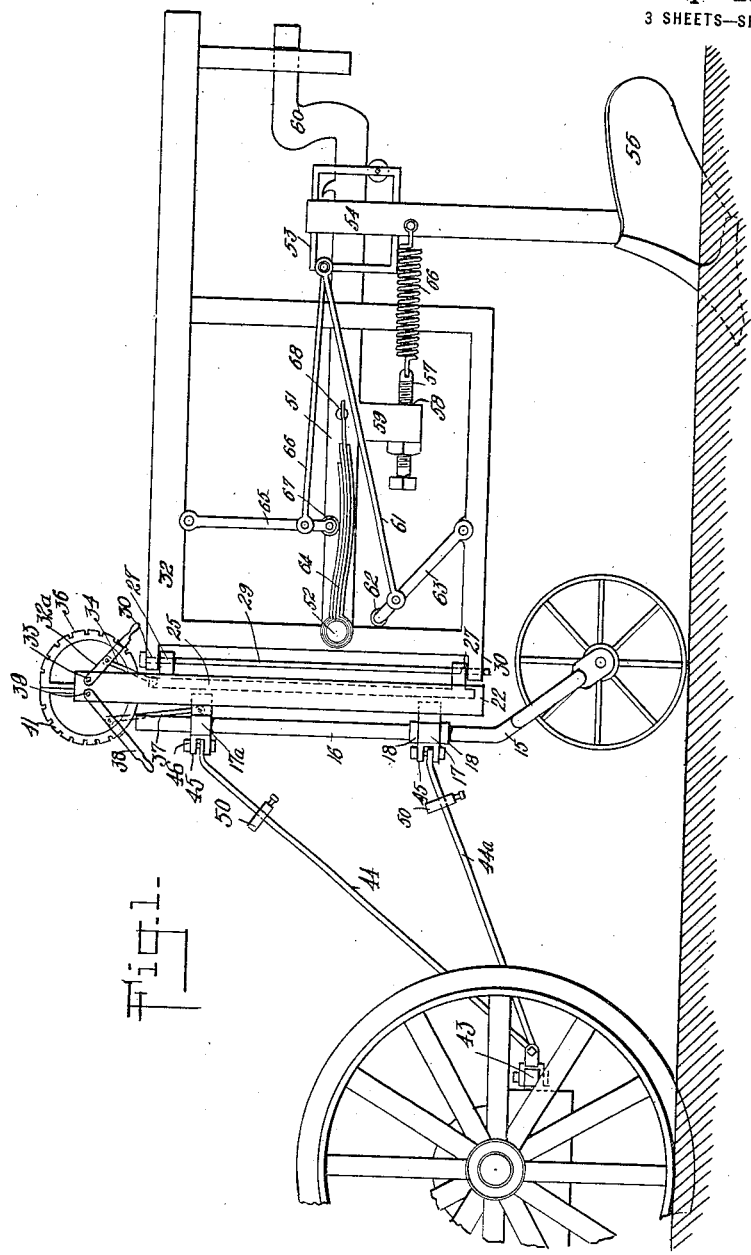
WITNESSES
INVENTOR
E. DUNLAP
BY
ATTORNEYS

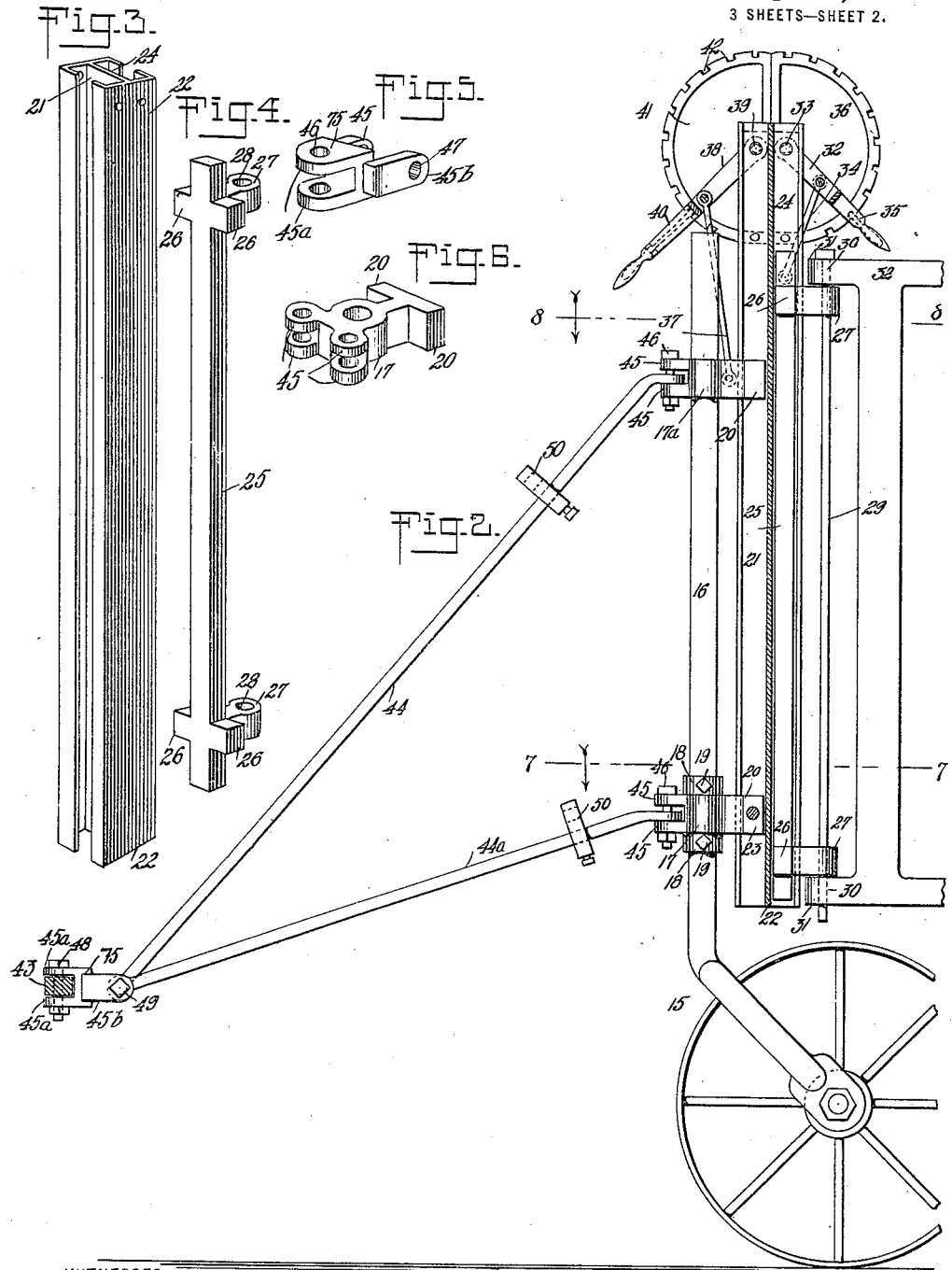
E. DUNLAP.
MOUNT FOR PLOWS AND OTHER TOOLS.
APPLICATION FILED JULY 19, 1920.
1,375,577. Patented Apr. 19, 1921.
3 SHEETS—SHEET 2.
WITNESSES
INVENTOR
E. DUNLAP
BY
ATTORNEYS

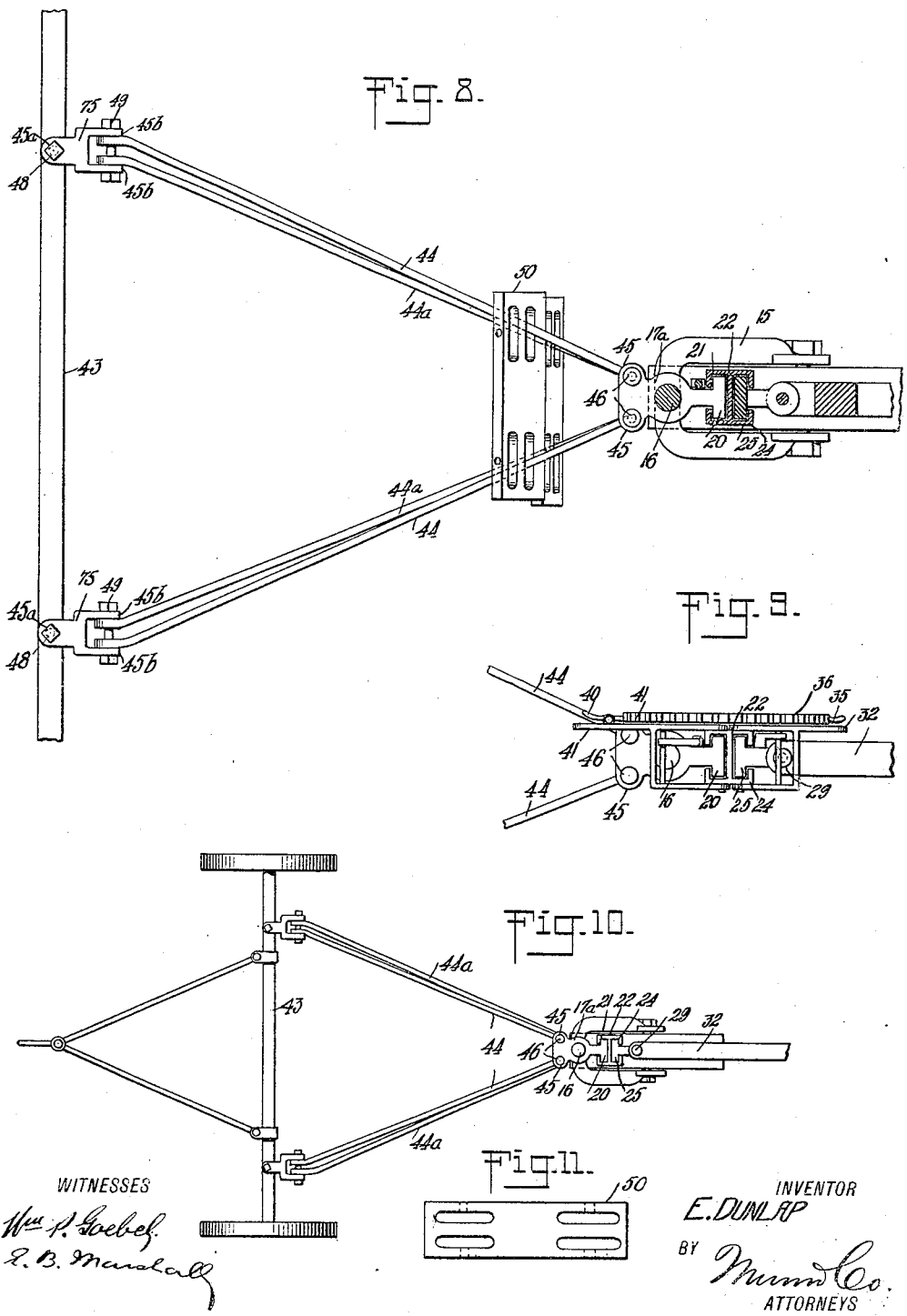

UNITED STATES PATENT OFFICE.

ELON DUNLAP, OF DIAMOND SPRINGS, CALIFORNIA.

MOUNT FOR PLOWS AND OTHER TOOLS.

1,375,577.   Specification of Letters Patent.   Patented Apr. 19, 1921.

Application filed July 19, 1920. Serial No. 397,163.

*To all whom it may concern:*

Be it known that I, ELON DUNLAP, a citizen of the United States, and a resident of Diamond Springs, Eldorado county, in the State of California, have invented a new and Improved Mount for Plows and Other Tools, of which the following is a full, clear, and exact description.

My invention has for its object to provide a gang plow supported on one wheel which may be turned or swung around relatively to the tractor or draft-member. This connection of the plow with the tractor or draft-member makes it possible for the plow to travel over any road that the tractor may travel and it also makes it possible for the tractor to run backwardly as well as forwardly with the plow attached. The plow may be turned around among trees and it is also possible when the plow shares are suspended to back the plow into corners. In this way the plow may be operated anywhere the tractor may go, on very small lots as well as on large fields.

Additional objects of the invention will appear in the following specification in which the preferred form of my invention is disclosed.

In the drawings similar reference characters refer to similar parts in all the views, in which my invention is illustrated as applied to my yielding mount for plows which is the subject matter of my U. S. Patent #1174699 granted March 7th, 1916.

In the accompanying drawings:

Figure 1 is a side elevation of my mount for plows and other tools.

Fig. 2 is an enlarged sectional view, showing parts illustrated in Fig. 1.

Fig. 3 is a perspective view of the post.

Fig. 4 is a perspective view of the guide-bar which slides in one of the guide-ways in the post.

Fig. 5 is a perspective view showing a coupling means for fastening the mount to a draft member.

Fig. 6 is a perspective view showing one of the collars which are mounted on the shank of the caster, the view illustrating the guide-members and lugs which are integral with the collar.

Fig. 7 is a sectional view on the line 7—7 of Fig. 2.

Fig. 8 is a sectional view on the line 8—8 of Fig. 2.

Fig. 9 is a plan view showing the caster, the post and the portion of the plow frame illustrated in Fig. 2.

Fig. 10 is a plan view illustrating the means for securing the mount to a draft-member.

Fig. 11 is a plan view illustrating one of the plates which are used to secure together the rods which connect the mount with the draft-member.

By referring to the drawings it will be seen that the mount is supported on a caster 15 having the usual shank 16, two collars 17 and 17$^a$ being mounted on the shank 16 as illustrated. The collar 17 is prevented from sliding on the shank 16 by collars 18 which are disposed one above and the other below the collar 17, the collars 18 being held in place by set-screws 19. As best illustrated in Fig. 6 of the drawings, these collars 17 have rearwardly extending guides 20 which are disposed in the forward guide-way 21 of the post 22. The guide 20 on the collar 17 is secured in place in the guide-way 21 by a rivet 23 which secures the guide 20 to the post 22, this rivet 23 being illustrated in Fig. 2 of the drawings. In the rear guide-way 24 of the post 22 there is disposed a guide-bar 25 having laterally extending guide lugs 26. Extending rearwardly from the guide-bar 25 there are lugs 27 having bearings 28 in which is disposed a pintle 29 which pintle 29 also extends through bearings 30 in lugs 31 on the gang plow frame 32. It will be seen that in the manner described the gang plow frame 32 is pivoted to the post 22 and that the post 22 is supported on the shank 16 of the caster 15.

For purposes of adjustment the guide-bar 25 may be raised or lowered in the guide-way 24 of the post 22 and may be supported in adjusted position. To effect this adjustment a lever 32$^a$ is pivoted to the post 22 at 33 and this lever 32$^a$ is connected with the guide-bar 25 by means of a link 34. The lever 32$^a$ is held in any desired position by means of a tooth 35 which engages the desired opening in the member 36 secured to the top of the post 22, said tooth being mounted on the lever 32$^a$ in a well known manner.

As has been stated the collar 17 is secured against vertical movement on the caster shank 16. The collar 17$^a$ may be raised or lowered on the caster shank 16 by means of a link 37, which connects the collar 17$^a$ with a lever 38 pivoted at 39 to the post 22. This lever 38 may be held in any desired position by means of the tooth 40 with which it is provided, in connection with the member 41 mounted on the post 22. The member 41 has the usual recesses 42, the tooth 40 being mounted on the lever 38 in a well known manner, and engaging the member 41 at one of the recesses 42.

The collars 17 and 17ª are connected with the draft-member 43 by means of the rods 44 and 44ª, these rods 44 having orifices at their rear terminals which are disposed between the lugs 45, the lugs 45 having orifices so that the bolts 46 may be disposed through the orifices in the lugs 45, and in the rear ends of the rods 44 to secure the said rods 44 to the collar 17ª. The rods 44 diverge forwardly from the collar 17ª. In a similar manner the rod 44ª are secured to the collar 17, these rods 44ª also diverging forwardly so that one of the rods 44 and one of the rods 44ª may be secured to the draft-member 43 and the other rod 44 together with the other rod 44ª may also be secured to the draft-member 43 by means of the couplings 75 illustrated in Fig. 5 of the drawings, these couplings having forward lugs 45ª with orifices 46 having vertical axes and rearwardly extending lugs 45ᵇ with orifices 47 having horizontal axes. The lugs 45ª of the coupling members 45 are disposed above and below the draft-member 43 as illustrated in the drawings, and bolts 48 are provided which extend through the orifices 46 and through orifices in the draft-member 43 in a manner readily understood. The forward ends of the rods 44 and 44ª have orifices with horizontal axes so that bolts 49 may be disposed through the orifice 47 and through the orifice in the forward ends of the rods 44 and 44ª to secure the forward ends of the said rods to the coupling member 75. It will be understood that additional orifices may be made in the draft-member 43 so that the coupling members 45 may be adjusted laterally on the draft-member 43 as may be desired. As a means of holding the collars 17 and 17ª rigid relatively to the rods 44 and 44ª, I propose to employ plates 50 which may be two in number, one to secure the two rods 44 together and the other to secure the two rods 44ª together. The manner in which these plates 50 are employed is best illustrated in Fig. 8 of the drawings, the plates 50 being employed in pairs which are disposed one above and the other below the rods the plates being bolted together, elongated openings being made in the plates so that the bolts may be readily adjusted relatively to the plates and to the rods.

The plow shown together with the plow frame are fully described in my United States Patent #1174699 dated March 7th, 1916. As fully described in the said patent, the beam 51 is pivoted to the plow frame 32 at 52, this beam supporting a carriage 53 to which is secured the head 54 of the plow share 55. The head 54 is held yieldingly forwardly by means of the spring 56 which is secured to the head 54, and to a screw 57 which meshes in a threaded orifice 58 in a lug 59, depending from the beam 51. The carriage 53 may travel rearwardly on the beam 51 and may rock on the rear portion 60 of the beam 51 in the manner described in my said patent. When the carriage 53 moves rearwardly and rotates on the curved rear portion of the beam 51 it pulls the link 61 rearwardly and thereby brings the roller 62 mounted on the lever 63, with which the link 61 is connected, into engagement with the spring 64 the carriage 53 also serving to move rearwardly the lever 65 by means of the link 66 so that the roller 67 mounted on the lever 65 is moved out of engagement with the spring 64. This spring 64 is mounted on the pivot 52 of the beam 51, and is secured to the beam 51 at 68. It will therefore be seen that when the levers 63 and 65 are moved rearwardly with the rear movement of the carriage 53, that the roller 67 will be moved out of engagement with the spring 64 and that the roller 62 will be moved into engagement with the spring 64, which will serve to press the spring 64 upwardly and with it the beam 51. In a similar way when the carriage 53 is moved forwardly the roller 67 will press downwardly the spring 64 and thereby press downwardly the beam 51 carrying the head 54 of the plow share 55.

Having thus described my invention, I claim as new and desire to secure by Letters Patent.

1. In a mount for plows, a caster, a post mounted on the caster, a plow frame pivoted on a vertical axis to the post, draft means connected with the caster and means to adjust the draft means vertically on the caster.

2. In a mount for plows, a caster, a post mounted on the caster, a plow frame pivoted on a vertical axis to the post, draft means connected with the caster and means to raise the draft means relatively to the caster.

3. In a mount for plows, a horizontal draft-member, a caster having a shank, a vertical post, collars secured to the post and mounted on the caster shank, and rods secured to the said collars, the rods diverging from each collar and being secured to the draft-member.

4. In a mount for plows, a draft-member, a caster having a shank, a post, two collars mounted on the caster shank, one being secured against longitudinal movement on the shank and also being secured to the post, the other collar being adjustable on the caster shank and relatively to the post, means to hold the adjustable collar in fixed position on the shank and post, and a plow frame pivoted to the post.

5. In a mount for plows, a draft-member, a caster having a shank, a post, two collars mounted on the caster shank, one of the collars being secured to the caster shank and to the post, the other collar being adjustable vertically on the caster shank, and relatively to the post, means to hold the adjustable collar in fixed position on the shank and post, a pivotal mounting adjustable vertically on the post, means to hold the pivotal mounting in adjusted position, and a plow frame mounted to rock on a vertical axis on the pivotal mounting.

6. In a mount for plows, a post having two vertical guide-ways, a guide slidable in one of the guide-ways and having lugs, a plow frame pivoted to the lugs, a caster having a shank, two collars mounted on the shank, one collar having a guide disposed in the other guide-way, the other collar being secured to the post, and means which limit the downward movement of the guides in the guide-ways.

7. In a mount for plows, a post having two vertical guide-ways, a guide slidable in one of the guide-ways and having lugs, a plow frame pivoted to the lugs, a caster having a shank, two collars mounted on the shank, one collar having a guide disposed in the other guide-way, the other collar being secured to the post, means which limit the downward movement of the guides in the guide-ways, a draft-member and rods diverging from each collar and secured to the draft-member.

8. In a mount for plows, a post having two vertical guide-ways, a guide slidable in one of the guide-ways and having lugs, a plow frame pivoted to the lugs, a caster having a shank, two collars mounted on the shank, one collar having a guide disposed in the other guide-way, the other collar being secured to the post, means which limit the downward movement of the guides in the guide-ways, a draft-member and rods diverging from each collar, secured to the draft-member, and braces connecting the rods.

9. In a mount for plows, a post having two vertical guide-ways, a guide slidable in one guide-way, and having lugs, a plow frame pivoted to the lugs, a caster having a shank, two collars mounted on the shank, one having a guide disposed in the other guide-way, the other collar being secured to the post, and means to hold the guides in the guide-ways in adjusted positions.

10. In a mount for plows, a post having a guide-way, a guide slidable in the guide-way, and having lugs, a plow frame pivoted to the lugs, a caster having a shank, two collars, mounted on the shank, and secured to the post, and means to hold the guide in the guide-way in adjusted position.

ELON DUNLAP.